United States Patent
Rüegg

(10) Patent No.: US 9,481,527 B2
(45) Date of Patent: Nov. 1, 2016

(54) METHOD AND DEVICE FOR SUPPLYING POURING ELEMENTS ARRANGED AND ALIGNED AT A DISTANCE FROM EACH OTHER AND COMPRISING A FLANGE

(71) Applicant: SIG Technology AG, Neuhausen am Rheinfall (CH)

(72) Inventor: Martin Rüegg, Uhwiesen (CH)

(73) Assignee: SIG Technology AG, Neuhausen am Rheinfall (CH)

( * ) Notice: Subject to any disclaimer, the term of this patent is extended or adjusted under 35 U.S.C. 154(b) by 0 days.

(21) Appl. No.: 14/420,156

(22) PCT Filed: Jul. 10, 2013

(86) PCT No.: PCT/EP2013/064558
§ 371 (c)(1),
(2) Date: Feb. 6, 2015

(87) PCT Pub. No.: WO2014/023504
PCT Pub. Date: Feb. 13, 2014

(65) Prior Publication Data
US 2015/0225181 A1    Aug. 13, 2015

(30) Foreign Application Priority Data

Aug. 7, 2012 (DE) ........................ 10 2012 015 465

(51) Int. Cl.
| B65G 47/31 | (2006.01) |
| B65G 47/32 | (2006.01) |
| B65B 37/00 | (2006.01) |
| B65B 61/18 | (2006.01) |
| B65G 19/02 | (2006.01) |

(Continued)

(52) U.S. Cl.
CPC ................. *B65G 47/32* (2013.01); *B31B 1/00* (2013.01); *B65B 37/00* (2013.01); *B65B 61/184* (2013.01); *B65G 19/02* (2013.01); *B65G 47/28* (2013.01); *B31B 2201/9085* (2013.01)

(58) Field of Classification Search
CPC ...... B65G 47/32; B65G 47/88; B65G 47/28; B65G 47/08; B65G 19/02
USPC ...... 198/461.1, 722, 723, 732, 419.2, 419.3, 198/459.8
See application file for complete search history.

(56) References Cited

U.S. PATENT DOCUMENTS

| 1,689,247 A * | 10/1928 | Lange .................... B21D 51/32 198/461.2 |
| 3,673,663 A | 7/1972 | Taddei |
| 4,010,841 A | 3/1977 | Bonzack |

(Continued)

FOREIGN PATENT DOCUMENTS

| CN | 201298547 Y | 8/2009 |
| CN | 202007032 U | 10/2011 |

(Continued)

*Primary Examiner* — William R Harp
(74) *Attorney, Agent, or Firm* — The Webb Law Firm

(57) ABSTRACT

A method and a device for supplying pouring elements arranged and aligned at a distance from each other and comprising a flange, wherein the pouring elements are each supplied directly strung together and are then separated. Acceleration of the first pouring element respectively may occur along a segment of a circle after brief stoppage of the following pouring element and transfer of the separated pouring elements to a further conveying path.

15 Claims, 6 Drawing Sheets

(51) Int. Cl.
*B65G 47/28* (2006.01)
*B31B 1/00* (2006.01)

(56) References Cited

U.S. PATENT DOCUMENTS

| | | | |
|---|---|---|---|
| 4,079,869 A | 3/1978 | Meier et al. | |
| 4,506,779 A | 3/1985 | Seragnoli | |
| 5,484,374 A | 1/1996 | Bachner et al. | |
| 5,979,147 A * | 11/1999 | Reuteler | B65G 47/088 198/419.2 |
| 6,321,896 B1 | 11/2001 | Zuccheri et al. | |
| 2001/0052216 A1 | 12/2001 | Hiramoto et al. | |
| 2009/0169718 A1 | 7/2009 | Casarini et al. | |
| 2012/0204513 A1 | 8/2012 | Skarin et al. | |

FOREIGN PATENT DOCUMENTS

| | | |
|---|---|---|
| DE | 2608393 A1 | 9/1976 |
| DE | 3137223 A1 | 7/1982 |
| DE | 69803456 T2 | 9/2002 |
| EP | 1167011 A2 | 1/2002 |
| EP | 1223028 A1 | 7/2002 |
| EP | 1813533 A1 | 8/2007 |
| EP | 2103564 A1 | 9/2009 |
| JP | 995306 A | 4/1997 |
| WO | 03024880 A1 | 3/2003 |

* cited by examiner

METHOD AND DEVICE FOR SUPPLYING POURING ELEMENTS ARRANGED AND ALIGNED AT A DISTANCE FROM EACH OTHER AND COMPRISING A FLANGE

CROSS-REFERENCE TO RELATED APPLICATIONS

This application is the United States national phase of International Application No. PCT/EP2013/064558 filed Jul. 10, 2013, and claims priority to German Patent Application No. 10 2012 015 465.8 filed Aug. 7, 2012, the disclosures of which are hereby incorporated in their entirety by reference.

BACKGROUND OF THE INVENTION

1. Field of the Invention

The invention relates to a method and to a device for supplying pouring elements arranged and aligned at a distance from each other and comprising a flange, wherein the pouring elements are each supplied directly strung together and are then separated.

2. Description of Related Art

When applying pouring elements to packaging, in particular beverage packaging, there is a requirement that the pouring elements, which usually consist of basic bodies having a pouring tube and a fastening flange and screw-on lid and optionally an opening element arranged in the basic body, must be supplied to the applicator at a predefined distance, wherein this distance is different depending on the applicator and packaging format. To achieve this the pouring elements are firstly individually aligned in order to then be able to be supplied in a guide rail or the like to the actual applicator.

A generic method and a corresponding device are known from U.S. Pat. No. 5,484,374 A. There the pouring elements are transferred to a conveyor belt in a clocked manner via a supply path, it being possible to variably determine the distance of the pouring elements by the clocking and the speed of the conveyor belt.

The known devices all have a complex construction with a large number of moving components and corresponding overall size and are therefore cost- and maintenance-intensive. The pouring elements sometimes experience abrupt acceleration when they are separated.

SUMMARY OF THE INVENTION

The object of the present invention is to design and develop a method and a device of the type mentioned in the introduction in such a way that a simple and an inexpensive embodiment is ensured. A compact construction is also desired.

An embodiment of the present invention achieves the object by acceleration of the first pouring element respectively along a segment of a circle after brief stoppage of the following pouring element and transfer of the separated pouring elements to a further conveying path.

In terms of the device, the object is achieved by a drivable rotary disc having a plurality of bearing blocks rotatably mounted thereon and each having a guide arm with an eye at its free end, a pin arranged immovably and eccentrically with respect to the rotary disc, a plurality of pivot arms, corresponding to the number of bearing blocks, having one eye respectively at each end, wherein one end forms a pivot joint with the eye of the associated guide arm and the other end is mounted so as to rotate about the pin, a drive cam as an elongated axis of each pivot joint and a guide rail system for conveying the pouring elements.

According to the invention the different circumferential speeds of the device which are brought about with the aid of a linkage are used to accelerate the pouring elements on a segment of a circle eccentric to the rotary disc during their onward conveying. This leads to an extremely attractive solution since the construction is simple, inexpensive and extremely compact, moreover. The pouring elements to be separated are also only exposed to moderate acceleration forces. The maintenance requirements are also minimised owing to the defined recurring rotational movement.

According to a further teaching of the invention the pouring elements are supplied linearly and preferably continuously. In a further embodiment of the invention the pouring elements are conveyed "upside down", i.e. with the top flange in a rail which laterally guides the flange of the pouring element. This is particularly expedient since additional elements such as grippers or the like may be dispensed with.

A further embodiment of the invention provides that the rotary disc has a central opening. Since the entire construction of the device occurs within the outer circumference of the rotary, disc this substantially determines the size of the overall device.

According to a further teaching of the invention the rotary disc is mounted on a fixed ring. If this occurs in the outer region of the rotary disc, the disc can then be driven in a further embodiment of the invention by an inner sprocket arranged concentrically underneath and which is preferably an annular gear wheel with internal teeth.

In a further embodiment of the invention the bearing blocks arranged on the rotary disc are ball bearing mounted to guarantee the device a long life.

A further teaching of the invention provides that the guide rail system has a supply rail, an acceleration rail and a transfer rail. The supply and transfer rails are expediently straight whereas the acceleration rail includes a segment of a circle spanning an angle of 180°. In a further embodiment of the invention the segment of a circle of the acceleration rail is concentrically arranged around the pin.

A further embodiment of the invention provides that at least the acceleration rail is part of a guide plate. However, it is also possible to design the guide plate to be so large that it also includes the supply rail and/or the transfer rail.

Finally it is preferably provided that the guide rail system is arranged in a single plane. This is particularly expedient since the pouring elements to be separated then do not have to be turned or vertically accelerated during the separation process.

DESCRIPTION OF THE INVENTION

Figure 1:
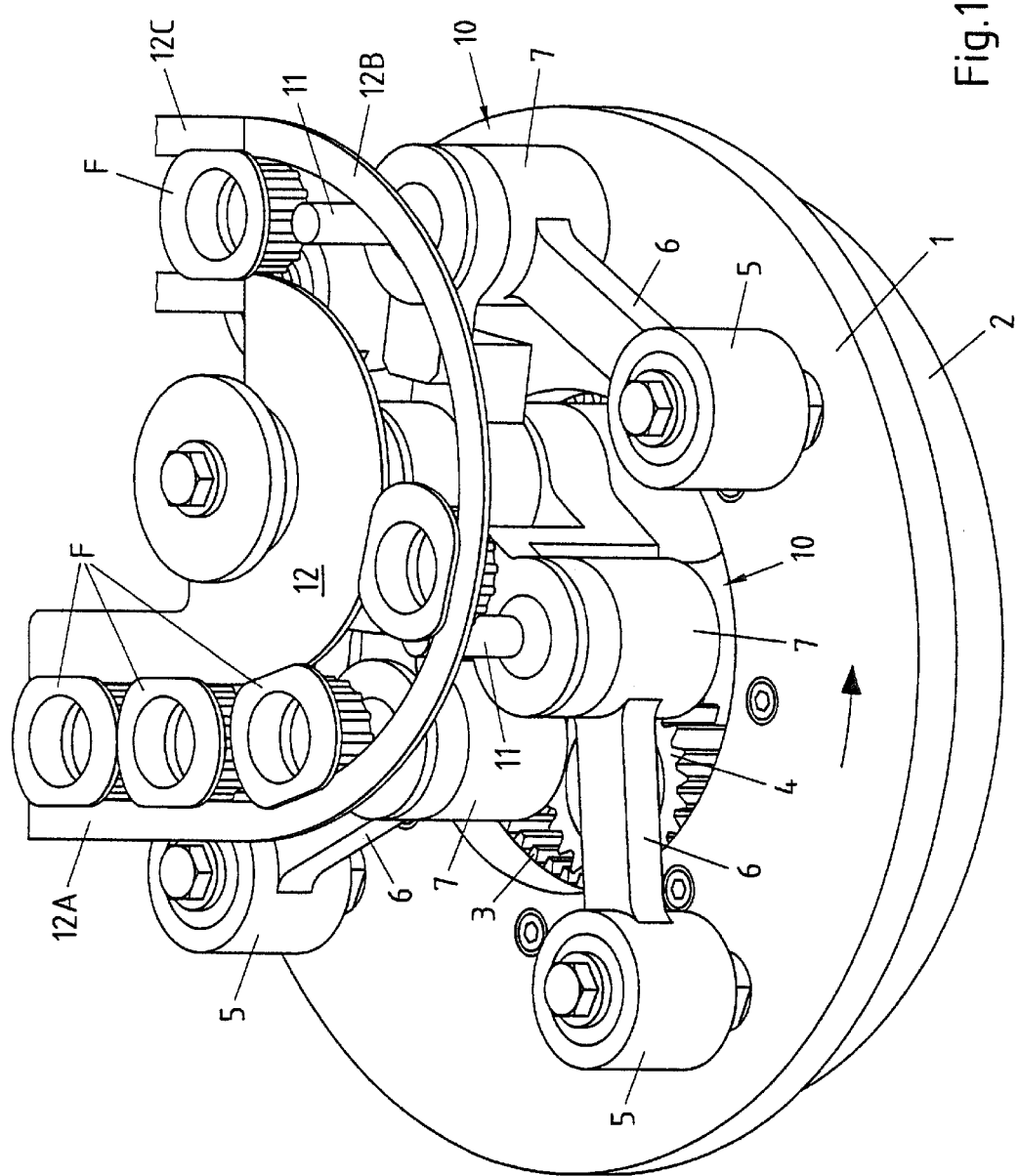
FIG. 1 shows a device according to the invention in a perspective view.

FIG. 1 shows a device according to the invention in a perspective view. A rotary disc 1 can firstly be seen which is rotatably arranged as a bearing on a fixed ring 2. The ring 2 is preferably designed as an outer ring, wherein an inner ring (not visible) with sprocket 3 is located inside the ring 2 and is screwed to the rotary disc and can be driven via a pinion 4.

In the illustrated, and to this extent, preferred, embodiment the rotary disc 1 has four bearing blocks 5 which are uniformly distributed on the rotary disc on a concentric circular path so as to be rotatable. The bearing blocks 5 all have a guide arm 6 and on the end thereof and eye 7, wherein the construction elements 5, 6, 7 are identically designed in each case in all four guides, as may be seen in particular from FIGS. 2 to 4 as well.

Figure 3:
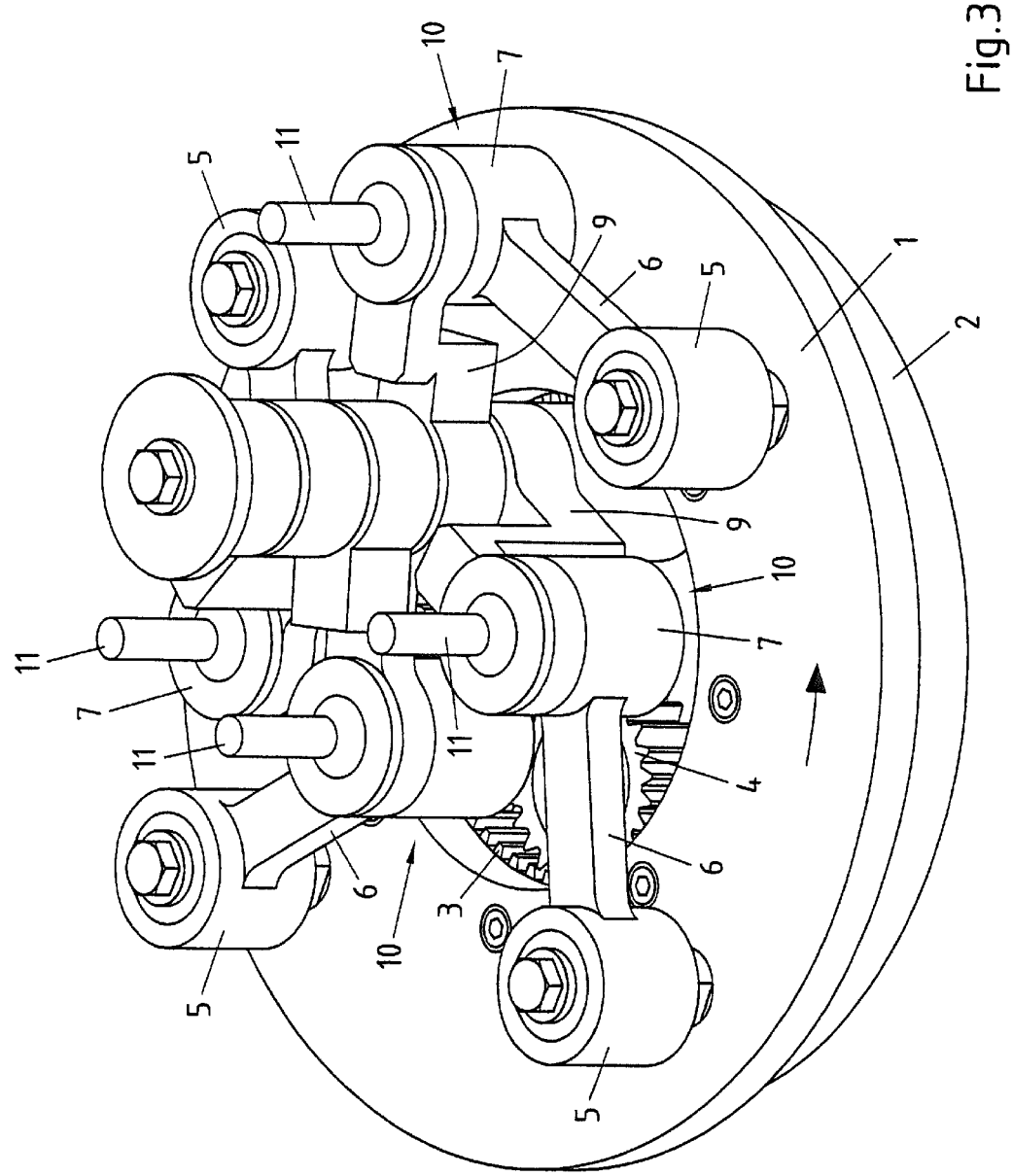
FIG. 3 shows a device according to the invention without guide rail system and in a perspective view.
Figure 4:
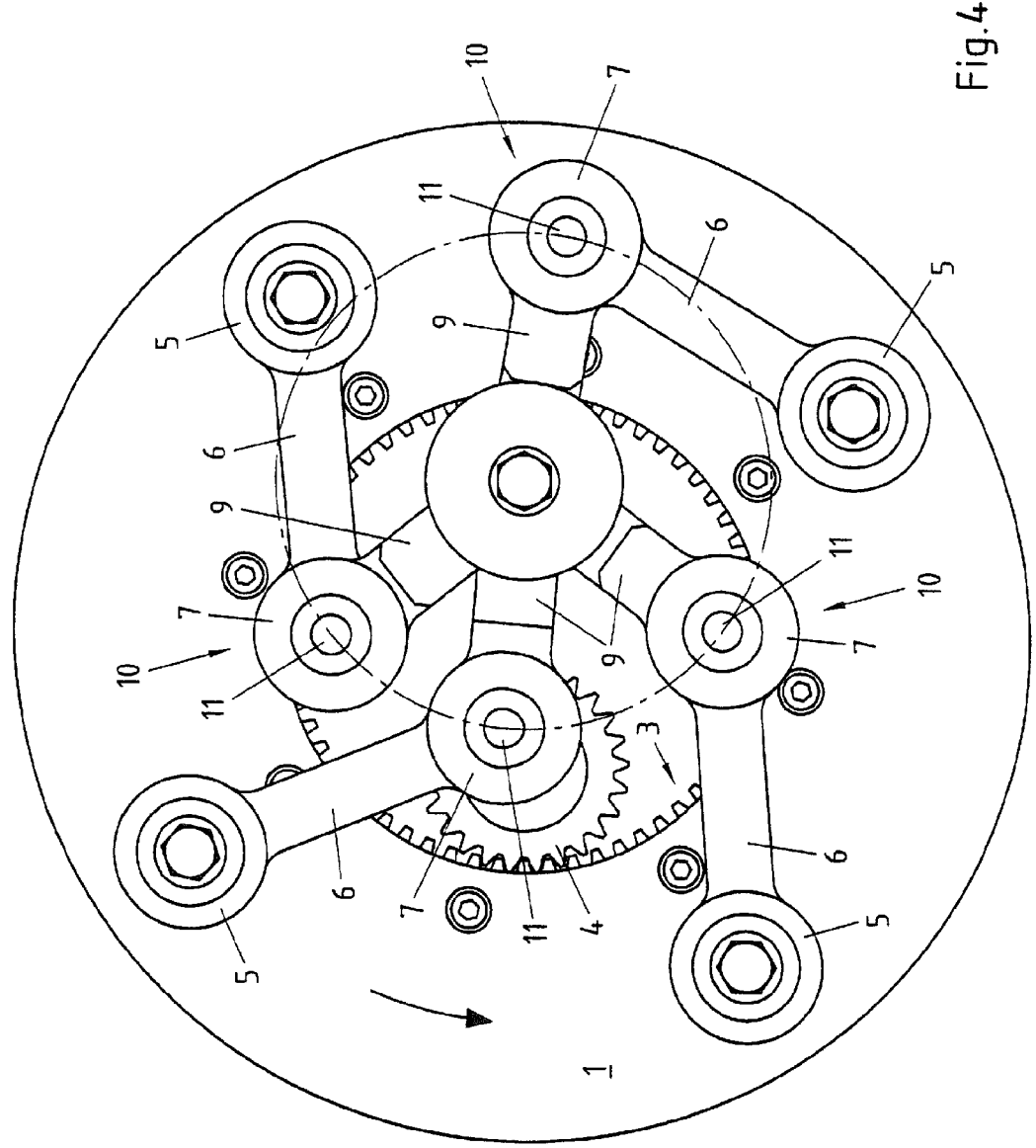
FIG. 4 shows the subject matter of FIG. 3 in a plan view.
Figure 5:
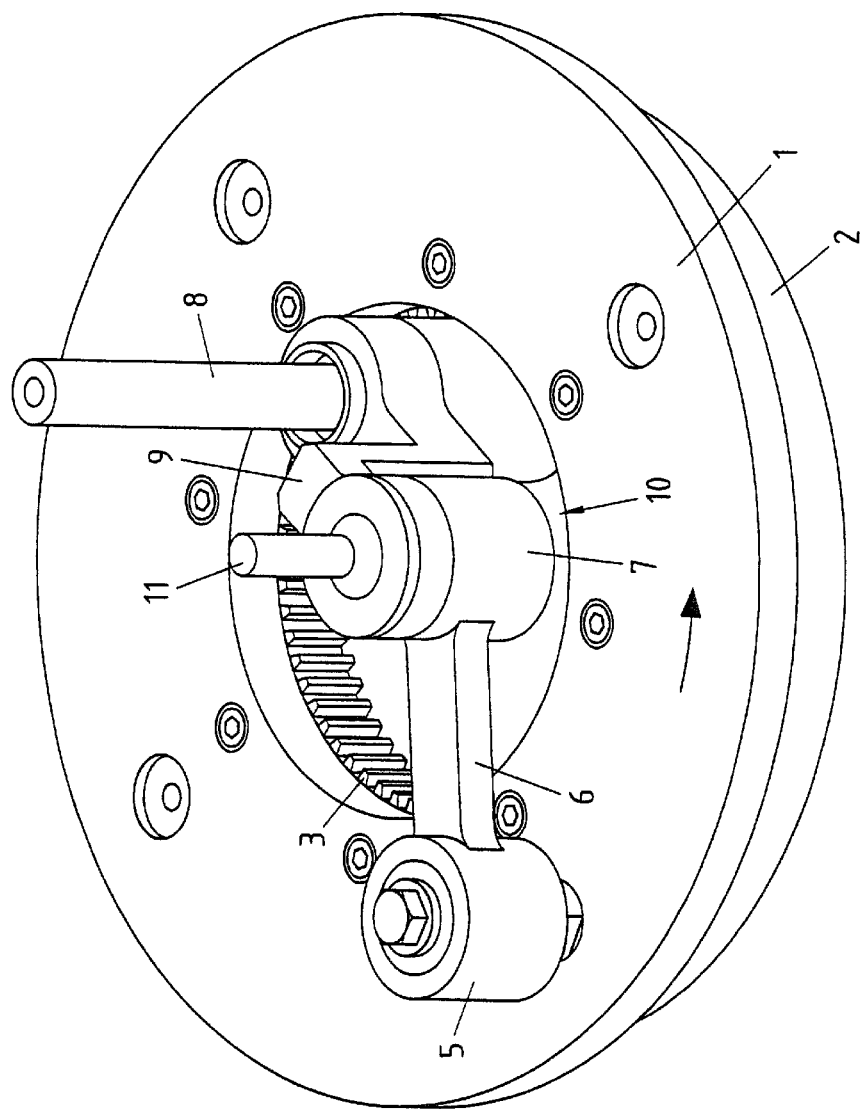
FIG. 5 shows a device according to the invention partially disassembled in a perspective view and FIG. 6 shows the subject matter from FIG. 5 in a plan view.

It clearly emerges from FIG. 5, which shows a partially disassembled device according to the invention, that an immovable pin 8 is provided inside the rotary disc 1 and is eccentric thereto and serves as a bearing pin for four further pivot arms 9 which are partially offset in order to be able to be pivoted one above the other on the pin 8, as clearly emerges particularly from FIG. 3. The pivot arms 9 have one bearing eye respectively at each end, of which ends, as mentioned above, one can be pivoted about the pin 8 and the other end, together with the respective counterpart, the eye 7 at the free end of the guide arm 6, forms a pivot joint 10.

Figure 6:
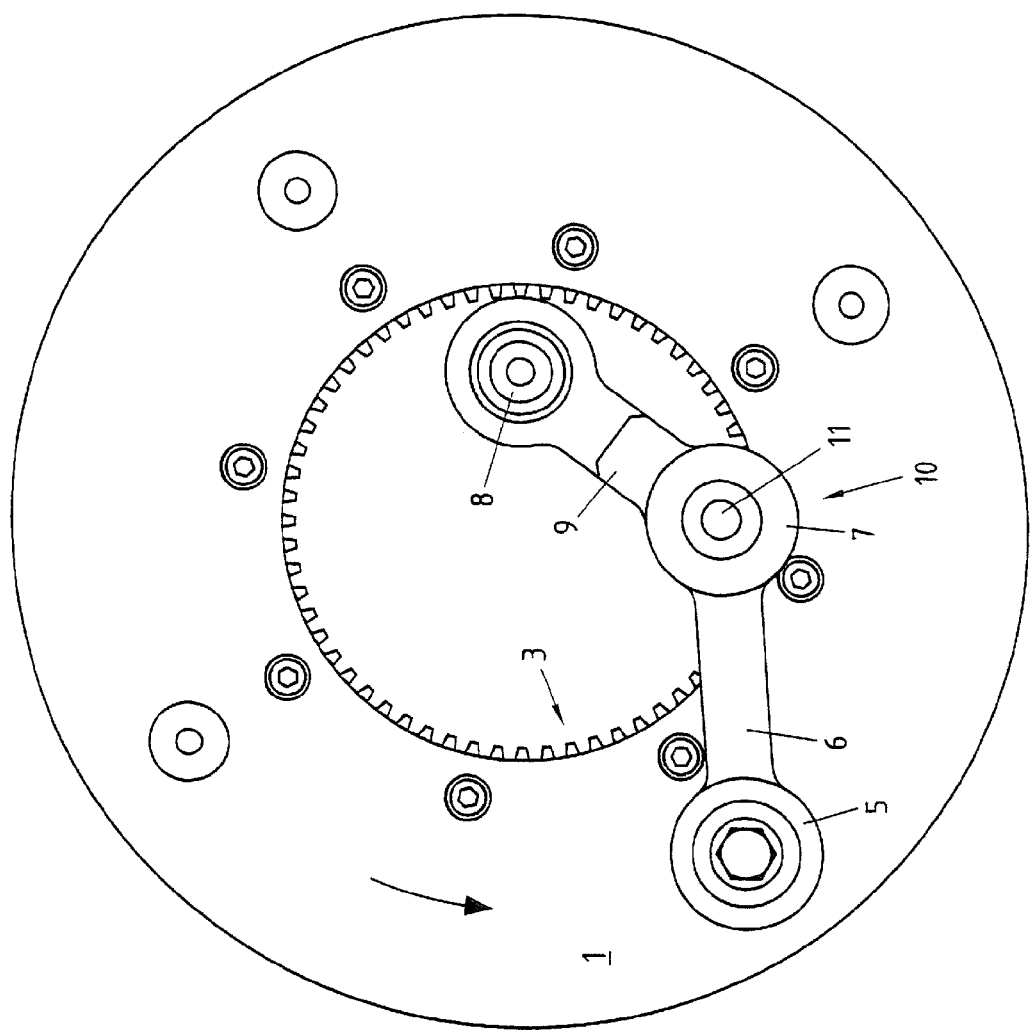

The linkage, comprising guide arm 6 and pivot arm 9, may clearly be seen from the plan view in FIG. 6 between the pivotal bearing block 5 and the fixed pin 8. In this embodiment the pivot joint 10, and therewith the drive cam 11 as well, performs a rotation along a circular path around the pin 8. This circular path is shown in dot-dash lines in FIG. 4.

In this way the drive of the rotary disc brings about uniform rotation of the bearing blocks 5 on a concentric circular path but eccentric rotation of the pivot joints 10, with respect to the rotary disc 1 in each case.

Figure 2:
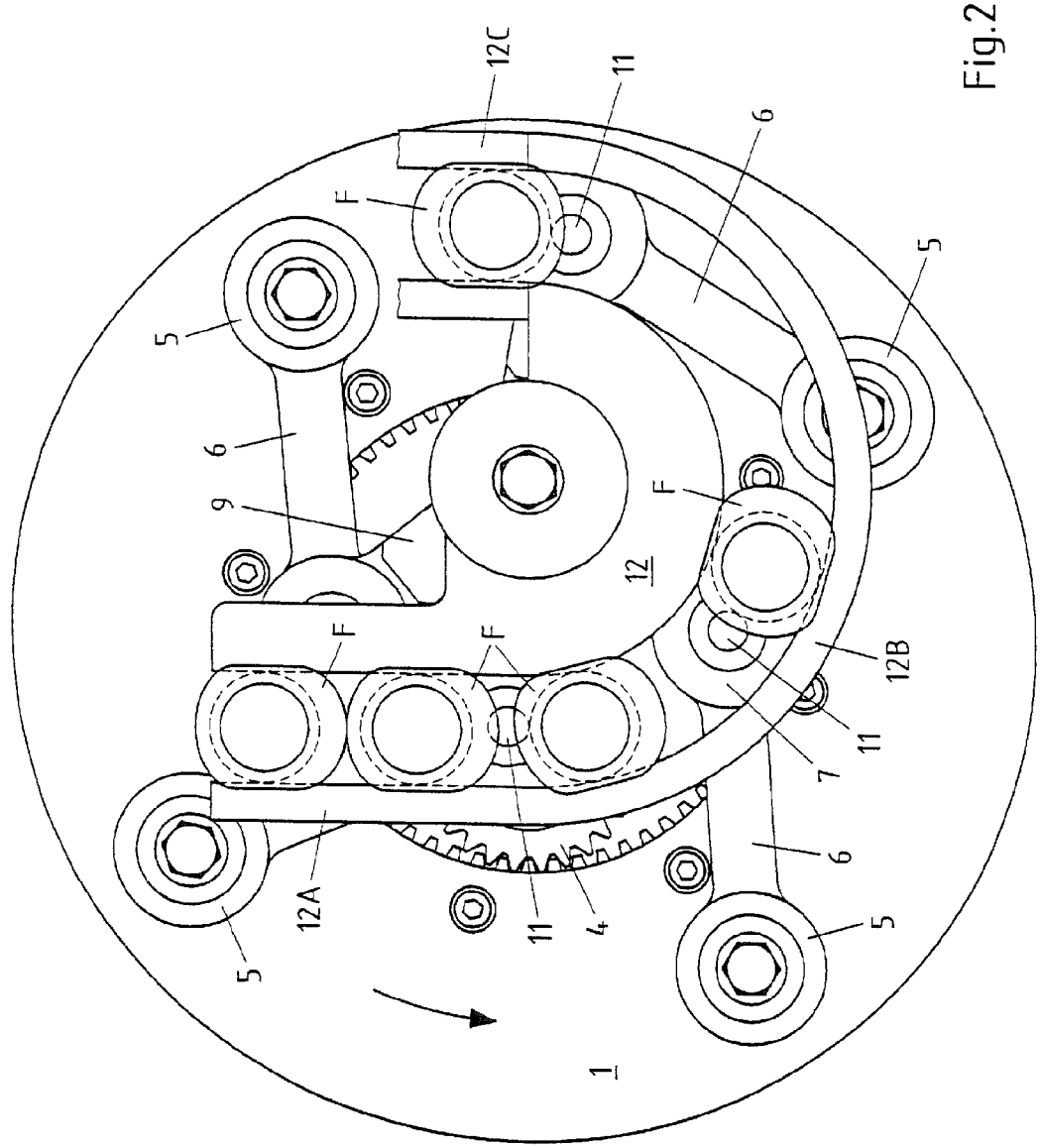
FIG. 2 shows a device according to the invention in a plan view.

It can be seen in particular in FIG. 2 that the eccentric rotation of the pivot joints 10 again occurs on a circular path concentric to the pin 8. To be able to use the different circumferential speeds here, the pivot joints 10 are provided with corresponding drive cams 11 which grip between the pouring elements F, introduced one after the other and spaced apart solely by their flange, in the region of a supply rail 12A and then accelerate the pouring elements F along an acceleration rail 12B and thereby separate them. After a rotation of 180° of a segment of a circle of the acceleration rail 12B, the separated pouring elements F are transferred via a merely hinted transfer rail 12C as further conveying path to the actual applicator which applies the pouring elements F to the packages (not shown).

It may also be seen from FIGS. 1 and 2 that the rail system, comprising supply rail 12A, acceleration rail 12B and transfer rail 12C, for guiding the pouring elements F can also be designed as a guide plate 12 to simplify construction further.

The invention is not limited to the illustrated embodiment but can, moreover, include a wide variety of constructions, without departing from the basic idea of the invention.

The invention claimed is:

1. A method for supplying pouring elements comprising a flange, the method comprising the steps of:

a) conveying the pouring elements, wherein the pouring elements are aligned at a first distance from one another;
   b) accelerating a first pouring element along a segment of a circle by moderate acceleration forces using different circumferential speeds, induced by a linkage, after brief stoppage of a following pouring element such that the first pouring element and the following pouring element are separated from one another by a second distance that is greater than the first distance; and
   c) transferring the separated pouring elements to a further conveying path.

2. The method according to claim 1, wherein, in step a), the pouring elements are supplied linearly.

3. The method according to claim 1, wherein, in step a), the pouring elements are supplied continuously.

4. The method according to claim 1, wherein the pouring elements are conveyed, accelerated, and transferred by their flange along a rail which laterally guides the flange of the pouring element.

5. A device for supplying pouring elements, wherein the pouring elements are arranged and aligned at a distance from each other and comprise a flange and the pouring elements are each supplied directly strung together and are then separated, comprising: a linkage with a drivable rotary disc having a plurality of bearing blocks rotatably mounted thereon and each having a guide arm with an eye at its free end, with a pin arranged immovably and eccentrically with respect to the rotary disc, with a plurality of pivot arms, corresponding to the number of bearing blocks, having one eye respectively at each end, wherein one end forms a pivot joint with the eye of the associated guide arm and another end is mounted so as to rotate about the pin, with a drive cam as an elongated axis of each pivot joint and a guide rail system for conveying the pouring elements.

6. The device according to claim 5, wherein the rotary disc has a central opening.

7. The device according to claim 5, wherein the rotary disc is mounted on a fixed ring.

8. The device according to claim 5, wherein the rotary disc is driven by a sprocket concentrically arranged underneath.

9. The device according to claim 8, wherein the sprocket is an annular gear wheel with internal teeth.

10. The device according to claim 5, wherein the bearing blocks are ball bearing mounted.

11. The device according to claim 5, wherein the guide rail system has a supply rail, an acceleration rail and a transfer rail.

12. The device according to claim 11, wherein the acceleration rail is designed as a segment of a circle spanning an angle of 180°.

13. The device according to claim 12, wherein the segment of a circle of the acceleration rail is arranged concentrically around the pin.

14. The device according to claim 11, wherein at least the acceleration rail is part of a guide plate.

15. The device according to claim 11, wherein the guide rail system is arranged in one plane.

* * * * *